United States Patent [19]

Castens

[11] Patent Number: 5,222,582
[45] Date of Patent: Jun. 29, 1993

[54] DOUBLE HYPERBOLOIDAL-TYPE CLUTCH

[75] Inventor: Rudolf R. Castens, Leiden, Netherlands

[73] Assignee: Hybo Science, Inc., Delray Beach, Fla.

[21] Appl. No.: 951,939

[22] Filed: Aug. 17, 1992

Related U.S. Application Data

[63] Continuation of Ser. No. 718,240, Jun. 20, 1988, which is a continuation-in-part of Ser. No. 418,795, Oct. 3, 1989, Pat. No. 5,067,601, which is a continuation of Ser. No. 112,638, Oct. 22, 1987, abandoned, which is a continuation-in-part of Ser. No. 16,458, Feb. 18, 1987, abandoned, which is a continuation-in-part of Ser. No. 821,453, Jan. 22, 1986, abandoned.

[51] Int. Cl.$^5$ .............................. F16D 41/10
[52] U.S. Cl. .................... 192/44; 192/48.92
[58] Field of Search ................ 192/44, 48.92

[56] References Cited

U.S. PATENT DOCUMENTS

| Re. 17,489 | 11/1929 | Anderson. | |
|---|---|---|---|
| Re. 18,789 | 4/1933 | Gahagan. | |
| Re. 32,346 | 2/1987 | Klamer et al. | 280/11.2 |
| 533,912 | 2/1895 | Moise. | |
| 1,047,551 | 12/1912 | Myers. | |
| 1,190,714 | 7/1916 | Bottome. | |
| 1,376,033 | 4/1921 | Page. | |
| 1,423,666 | 7/1922 | Langhaar. | |
| 1,555,939 | 10/1925 | Brisbois. | |
| 1,670,197 | 5/1928 | Humfrey | 192/45 |
| 1,736,837 | 11/1929 | Reich. | |
| 1,901,714 | 3/1933 | Vincent. | |
| 1,929,782 | 10/1933 | Hughes | 192/48.92 |
| 1,955,879 | 4/1934 | Griswold | 192/48.92 |
| 2,009,964 | 7/1935 | Mottlau | 192/45 |
| 2,064,230 | 12/1936 | Starr | 51/48 |
| 2,187,471 | 1/1940 | Hutchinson | 51/278 |
| 2,211,548 | 8/1940 | Schwinn | 192/64 |
| 2,323,753 | 7/1943 | Jaeger et al. | 192/4 |
| 2,345,972 | 4/1944 | Hardy | 192/50 |
| 2,451,621 | 10/1948 | Houston | 74/205 |
| 2,493,418 | 1/1950 | Orshansky, Jr. | 74/125.5 |
| 2,547,453 | 4/1951 | Egy | 74/679 |
| 2,633,951 | 4/1953 | Ayer et al. | 192/45 |
| 2,816,458 | 12/1957 | Castrow | 74/679 |
| 2,892,522 | 6/1959 | Moo | 192/45 |
| 3,147,595 | 9/1964 | Liang | 60/54 |
| 3,163,988 | 1/1965 | Gabriel | 60/54 |
| 3,212,405 | 10/1965 | Smith | 90/11 |
| 3,229,549 | 1/1966 | Riedl | 74/640 |
| 3,247,727 | 4/1966 | Digby et al. | 74/7 |
| 3,447,396 | 6/1969 | Seliger | 74/650 |
| 3,557,921 | 1/1971 | Takada | 192/45 |
| 3,779,654 | 12/1973 | Horne | 403/62 |
| 3,790,187 | 2/1974 | Radu et al. | 280/11.2 |
| 3,800,927 | 4/1974 | Takata | 192/45 |
| 3,818,855 | 6/1974 | Shimanckas | 115/34 R |
| 3,874,253 | 4/1975 | Waddington | 74/804 |
| 3,885,544 | 5/1975 | Pfeiffer | 123/179 SE |

(List continued on next page.)

FOREIGN PATENT DOCUMENTS

| 230739 | 10/1960 | Australia. |
|---|---|---|
| 53-93241 | 8/1978 | Japan. |
| 63-219922 | 9/1988 | Japan. |
| WO8903941 | 5/1989 | PCT Int'l Appl. |
| 452700 | 3/1973 | U.S.S.R. |
| 1368739 | 10/1974 | United Kingdom. |
| 1550175 | 8/1979 | United Kingdom. |
| 190017A | 8/1986 | United Kingdom. |
| 312656A | 4/1989 | United Kingdom. |

*Primary Examiner*—Rodney H. Bonck
*Attorney, Agent, or Firm*—Malin, Haley, DiMaggio & Crosby

[57] ABSTRACT

A reversible unidirectional clutch of the hyperboloidal type having an inner race whose surface approximates a hyperboloidal, and an outer race formed of a super derivative forming a volume therebetween for disposition of thurst transmitting rollers. The engagement direction of which may be reversed with reversing the skew of the thurst transmitting rollers allowing rotation of the inner and outer race in both directions or, selectively, in either one direction or the other, or capable of freewheeling each race in both directions.

6 Claims, 3 Drawing Sheets

U.S. PATENT DOCUMENTS

| | | | |
|---|---|---|---|
| 3,930,341 | 1/1976 | Neuman | 51/89 |
| 3,937,311 | 2/1976 | Gehrke | 192/45 |
| 3,942,616 | 3/1976 | Elmore | 192/45 |
| 3,993,178 | 11/1976 | Mendoza-Orozco | 192/64 |
| 4,022,308 | 5/1977 | Hurst | 192/21 |
| 4,046,238 | 9/1977 | Mendoza-Orozco | 192/45 |
| 4,159,830 | 7/1979 | Solimine | 280/11.28 |
| 4,181,043 | 1/1980 | Waddington . | |
| 4,291,505 | 9/1981 | Taniishi et al. | 51/289 R |
| 4,302,196 | 11/1981 | Blanchard | 440/75 |
| 4,375,739 | 3/1983 | Machida et al. | 51/58 |
| 4,418,947 | 12/1983 | Talafuse | 285/168 |
| 4,441,315 | 4/1984 | Bochot | 60/345 |
| 4,461,375 | 7/1984 | Brown | 192/45 |
| 4,462,490 | 7/1984 | Hattori | 192/0.076 |
| 4,493,316 | 1/1985 | Reed et al. | 128/80 C |
| 4,553,767 | 11/1985 | Robjent et al. | 280/11.21 |
| 4,574,649 | 3/1986 | Seol | 74/138 |
| 4,637,802 | 1/1987 | Taguchi et al. | 440/75 |
| 4,644,828 | 2/1987 | Kozakae | 74/802 X |
| 4,656,789 | 4/1987 | Schwar | 51/105 R |
| 4,683,998 | 8/1987 | Cigdem et al. | 192/58 C |
| 4,693,351 | 9/1987 | Adolfsson | 192/48.92 |
| 4,705,411 | 11/1987 | Kellstrom | 384/450 |
| 4,720,001 | 1/1988 | Jensen | 192/13 R |
| 4,770,279 | 9/1988 | Shiozaki et al. | 192/45 |
| 4,795,474 | 1/1989 | Horvath | 623/27 |
| 4,883,152 | 11/1989 | Froment | 192/42 |
| 4,907,466 | 3/1990 | Kuhn | 74/378 |
| 4,989,704 | 2/1991 | Morishita et al. | 192/45 |
| 5,024,307 | 6/1991 | Wakabayashi | 192/40 |
| 5,048,635 | 9/1991 | Wakabayashi et al. | 180/247 |
| 5,067,601 | 11/1991 | Castens | 192/65 |

DOUBLE HYPERBOLOIDAL-TYPE CLUTCH

This is a continuation of copending application Ser. No. 07/718,240 filed on Jun. 20, 1988 which is a continuation-in-part of Ser. No. 07/418,795 filed Oct. 3, 1989, now issued as U.S. Pat. No. 5,067,601 on Nov. 26, 1991, which is a continuation of Ser. No. 07/112,638 filed Oct. 22, 1987, now abandoned, which is a continuation-in-part of Ser. No. 07/016,458 filed Feb. 18, 1987, now abandoned, which is a continuation-in-part of Ser. No. 06/821,453 filed Jan. 22, 1986, now abandoned.

BACKGROUND OF THE INVENTION

1. Field of the Invention

This invention relates generally to couplings and more particularly to reversible or bidirectional unidirectional clutches of the hyperboloidal type.

2. Description of the Prior Art couplings comprising unidirectional clutches of the hyperboloidal type are becoming well known, principally as a result of the disclosure in my U,.S. Patent application Ser. No. 07/418,795, now U.S. Pat. No. 5,867,601, and related applications. These couplings generally comprise an inner race member defined as a sub-derivative hyperboloidal solid, and outer race member defined as a super derivative hyperboloidal solid, and a plurality of thurst transmitting rollers disposed in an annular volume defined by confronting surfaces of said inner and outer race members. The rollers are all similarly inclined with respect to radial planes and make continuous contact along the curving inner and outer race surfaces due to their inclination angle. Heretofore, my hyperboloidal couplings have been of the non-reversible and unidirectional variety, because only one-half of the hyperboloid body has been used, therefore capable of torque transmitting engagement between the races, through the rollers, in only one direction.

It would be highly desirable to provide a coupling having all of the advantages and benefits attendant to the hyperboloidal type clutch, the engagement direction of which may be reversed without reversing the skew of the inclined rollers, and also to provide a bidirectional clutch which may be engaged with respect to attempted rotation of the inner and outer race members in both directions or, selectively, in either one direction or the other or, finally capable of freewheeling with respect of rotation of the races in both directions.

SUMMARY OF THE INVENTION

It is therefore a principal object of the present invention to provide a reversible unidirectional clutch of the hyperboloidal type.

It is also a principal object of the present invention to provide a bidirectional clutch of the hyperboloidal type which may be selectively engaged to transmit torque in one direction, both directions, or to freewheel with respect to rotation of inner and outer race members in both directions.

It is a further object of the present invention to provide a reversible unidirectional clutch of the hyperboloidal type wherein the outer race member is reciprocally movable between a first position and a second position with respect to the inner race member to provide unidirectional torque transmitting engagement with the inner race member through the rollers when the outer race member is in said first position yet to provide unidirectional torque transmitting engagement in the opposite direction when the outer race member is in the second position.

These and other objects are carried out by the provision of a reversible and a bidirectional coupling of the hyperboloidal type as described herein.

The reversible unidirectional clutch is comprised of an inner race member defining an inner face surface having a sloping contour approximating a hyperboloid, a minimum diameter throat section lying on a radial plane which is a plane of symmetry dividing the inner race member into a first stage and a second stage. The ends of the inner race member away from the throat section are referred to as first and second, opposed, larger diameter ends. These ends are preferably provided with integral annular shoulder members adapted to support a plurality of cylindrical thrust transmitting rollers axially thereof.

The outer race member is comprised of a super derivative hyperboloidal solid defining an outer race surface disposed concentrically about said inner race surface so as to form a volume therebetween. The outer race surface approximates generally a hyperboloid accepting a distinct discontinuity through its central radial plane of symmetry. This discontinuity is formed by starting with a standard outer race member, removing a portion thereof by making cuts along a radial plane a distance x to one side of the radial plane of symmetry of the outer race and a second cut along a second radial plane a distance x to the other side of said radial plane of symmetry of said outer race member and sandwiching together the respective halves remaining. The outer race member is reciprocally slidable with respect to the inner race member along a direction parallel to the axis of rotation of the clutch.

A plurality of thurst transmitting rollers are disposed in the space between the inner and outer race surfaces having a length corresponding generally to the distance between the first and second large diameter ends of the inner race member. As is well known in the field of hyperboloidal clutches, these rollers make continuous contact with the inner race surface along a line which winds somewhat ethically with respect to the axis of rotation of said rollers. However, because of the discontinuity in the shape of the outer race surface, only approximately one-half of the outer race surface makes contact with first halves, or a first stage of said rollers at any given time. This permits outer transmitting engagement with respect to attempted relative rotation of the inner and outer race members in one direction yet permit freewheeling in the opposite direction when the outer race is moved into the first position. When the outer race member is moved to the second position, the other half of the outer race surface makes contact with the second halves, or second stage, or the rollers to obtain unidirectional clutch action in the opposite direction of attempted relative rotation of the inner and outer races.

The bidirectional clutch of the instant invention is formed by placing an adjustable biasing member between the two halves of the outer race member after the material referred to above has been removed the distance x from both sides of the radial plane of symmetry thereof. In this way, both halves of the outer race member may be placed in thrust transmitting contact with the rollers to cause lock-up with the inner race as to both directions of attempted rotation, or alternatively, only one said half of the outer race member may be made to contact the first or second halves of the rollers, or further alternatively both outer race surfaces may be maintained out of contact with the rollers for freewheeling of the outer race with respect to the inner race as to directions of rotation.

In accordance with these and other objects which will be apparent hereinafter, the instant invention will now be described with particular reference to the accompanying drawings.

DETAILED DESCRIPTION OF THE PREFERRED EMBODIMENT

Figure 1:
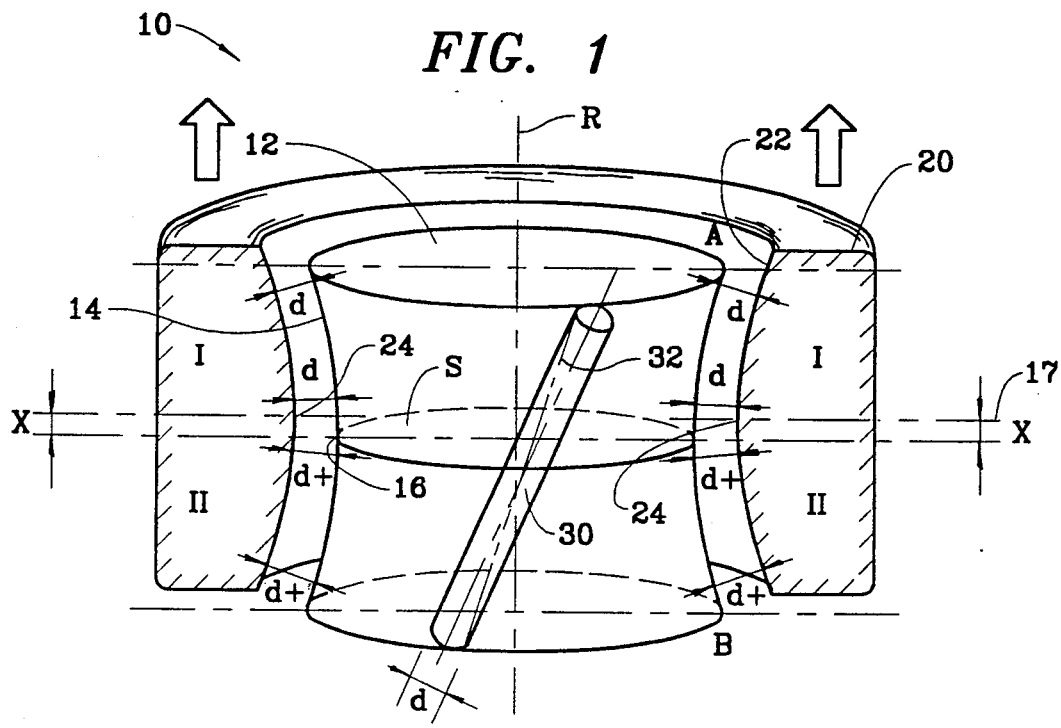
FIG. 1 is a perspective view of a reversible unidirectional clutch of the double-hyperboloidal-type wherein the outer race member is in a first position for thrust transmitting engagement with first halves of the roller.
Figure 2:
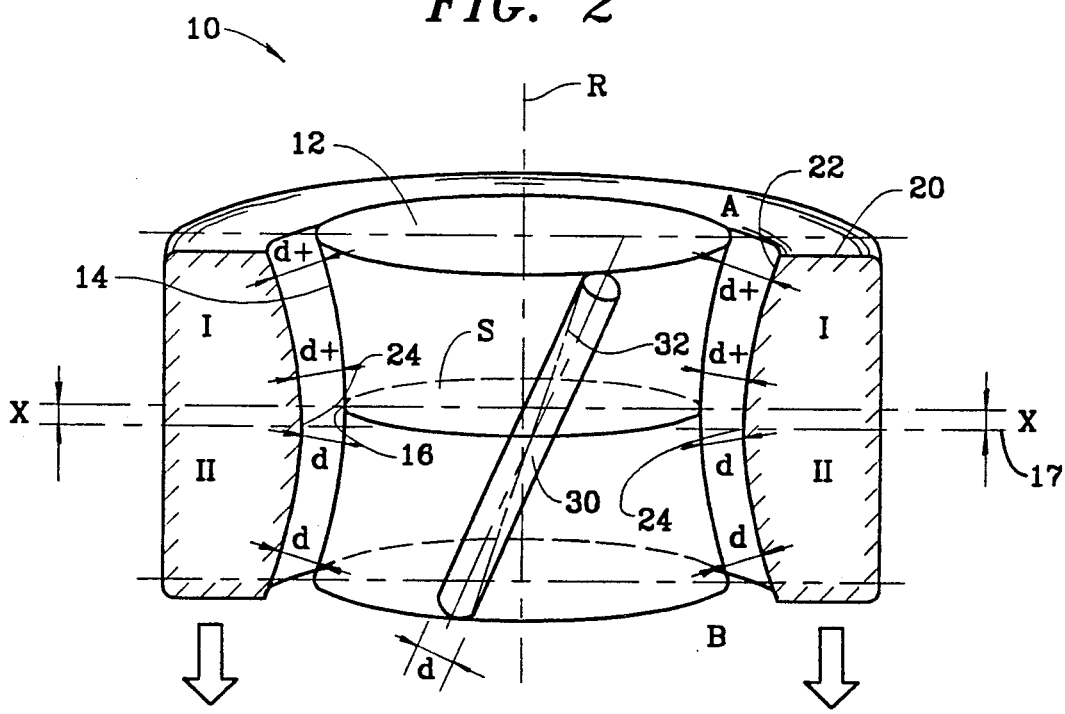
FIG. 2 is a perspective view of a reversible unidirectional clutch of the double-hyperboloidal-type wherein the outer race member is in a second position for thrust transmitting engagement with the rollers in the opposite direction to that of FIG. 1.

Referring now to the drawings, FIGS. 1 and 2 show a reversible unidirectional clutch or coupling 10 of the hyperboloidal type comprised of an inner race member 12, which is a sub-derivative hyperboloidal solid defining an inner race surface 14. Inner race member 12 has a cross-section of minimum diameter, or thorat section, 16 lying on a radial plan S which is a plane of symmetry dividing the inner race member into a first stage I and a second stage II. Inner race member 12 also has first and second larger diameter ends A and B, respectively, which generally define a termini of the operative portion of the clutch.

Clutch 10 is also provided with an outer race member 20 concentrically disposed about inner race member 12. Said outer race member 20 defines an outer race surface 22 which forms a confronting surface with inner race surface 14 and defines a generally annular void therebetween. A plurality of thrust-transmitting rollers 30, one of which is shown in FIGS. 1 and 2, are disposed in said annular volume, all inclined at a similar angle with respect to radial planes. Said rollers contact the inner race surface along a lien 32 which winds somewhat helically with respect to roller 3, said line 32 acting as a generator of surface 14 when coated about the rolling axis R of the clutch.

Figure 3A:
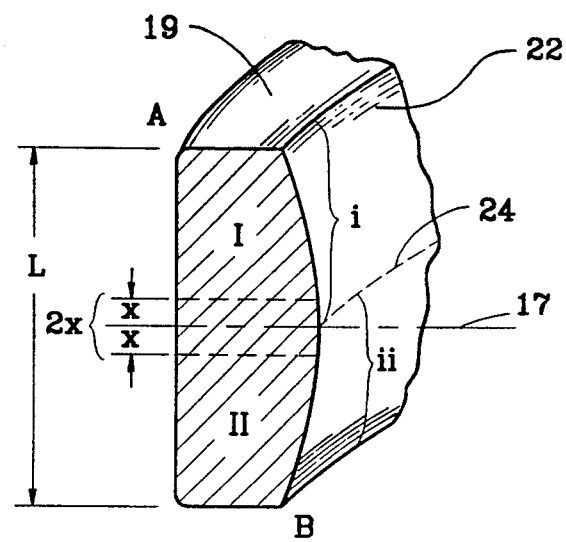
FIG. 3A is a partial cross-sectional perspective view of an unmodified outer race member prior to being modified for use with the instant invention.
Figure 3B:
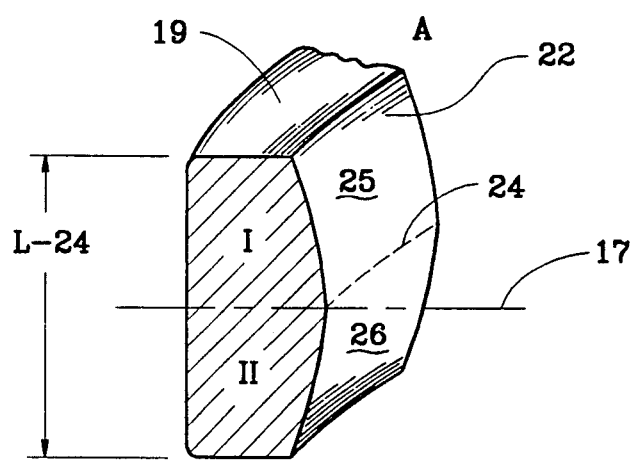
FIG. 3B is a partial cross-sectional perspective view of a portion of the modified outer race member used with the reversible clutch of FIGS. 1 through 4.

FIG. 3A shows a portion of an unmodified outer race member 20 having a height L and opposed first and second end portions A and B corresponding to the first and second large diameter portions A and B of inner race member 12. In order to provide an outer race member which will allow reversible unidirectional clutching as shown in FIGS. 1 and 2, it is necessary to modify the outer race member 20 shown in FIG. 3B by removing a portion of the center of said outer race member a distance x from radial plane of symmetry passing through center line 17 and connecting the remaining halves, or stages, I and II. What remains is a modified outer race member 20 having a height L-2x and defining inner race surfaces 25 and 26 on either side of a margin of discontinuity 24 in outer race surface 22. The distance x is determined by the parameters L (the length of the outer race), the minimum and maximum diameters of the inner and outer race member 12 and 14, respectively, the profile of confronting surfaces 22, 25, and 26, and the confronting race surface clearance dimensions d and d+, such that when outer race 14 is translated axially a distance X with respect to inner race 12, dissension d becomes d+. The distance "x", and hence the gap width "d+", need only be large enough to cause the second stage outer race surface to be removed from positive engagement, or line contact, with rollers 30 when outer race member 20 is moved to the position shown in FIG. 1. Likewise, the distance "x", and hence the gap width "d+", need only be large enough to cause the first stage outer race surface to be removed from positive engagement with rollers 30 when the outer race member 20 is placed in the position shown in FIG. 2. Outer race surface portions 25 and 26 correspond to first and second state halves I and II, respectively.

Unmodified outer race member 20 is formed by rotating the line of contact 32 between roller 30 and the outer race member 20 through 360° about axis R. However, such as outer race, if positioned about inner race member 12 with rollers 30 installed, would lock up in both directions and hence not function as a unidirectional clutch or freewheel. Therefore, it becomes necessary to reduce the length L of outer race 20 by a distance 2x, shown in FIG. 3A, so that when outer race 20 is moved to a position wherein rollers 30 contact first stage inner race surface portion 25 along liens of generation 32 of said surface 25, and when outer race member 20 is moved to a second, reversed position, shown in FIG. 2, the lower halves of roller 30 contact outer race surface 22 at second stage outer race surface portion 26 to provide jamming engagement with respect to rotation of the outer race relative to the inner race in the opposite direction. Arrows indicating freewheeling direction of rotation of the inner relative to the outer race are shown in FIGS. 1 and 2.

Figure 4:
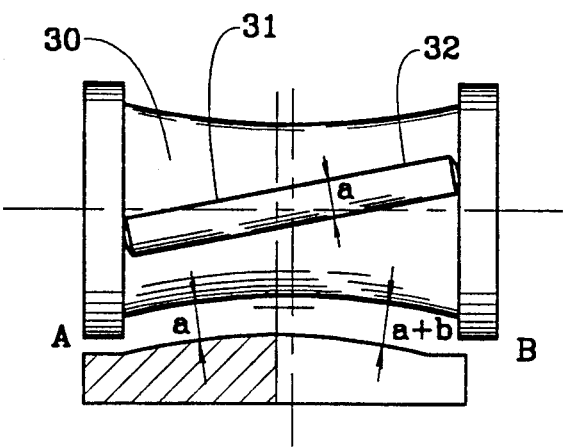
FIG. 4 is a cross-sectional elevation view of FIG. 1 turned on its side.

FIG. 4 shows the reversible unidirectional clutch in accordance with FIG. 2 mountable to a rotatable shaft (not shown) wherein outer race member 20 is shown moved to the seconds stage engagement position wherein second halves 32 of rollers 30 are disposed in contact with second outer race surface portion 26 for unidirectional clutch action in the second direction of attempted relative rotation of the inner and outer races. In this way, it can be seen that clutch 10 is reversible in that said clutch transfers torque between inner and outer races in one direction of rotation of said races when the outer race is moved to the first position, shown in FIG. 1, and transfers torque in a second direction of attempted relative rotation of the inner and outer races when the outer race is in the second position, shown in FIGS. 2 and 4.

Figure 5:
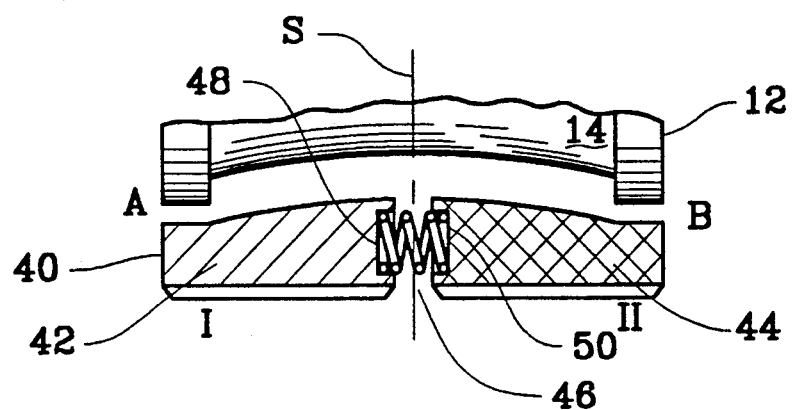
FIG. 5 is a partial cross-sectional elevational view of an embodiment of a bidirectional clutch in accordance with the present invention.

FIG. 5 shows a bidirectional clutch constructed in accordance with the present invention wherein outer face member 40 is divided into a first half 42 and a second half 44 corresponding to the first and second stages, respectively. A biasing means such as coil spring 46 is positioned between outer race halves 42 and 44, preferably recessed within recesses 48, 50. In this way, the relative positions of first and second outer race stages 42 and 44 may be adjusted so that the clutch may be act as a freewheel when the outer race hales 42 and 44 are brought into contact with one another and centered about plane S. Alternatively, either or both of outer race halves 42 and 44 may be brought into contact with roller 30 depending upon the position of said outer race halves with respect to the plane of symmetry S.

Figure 6:
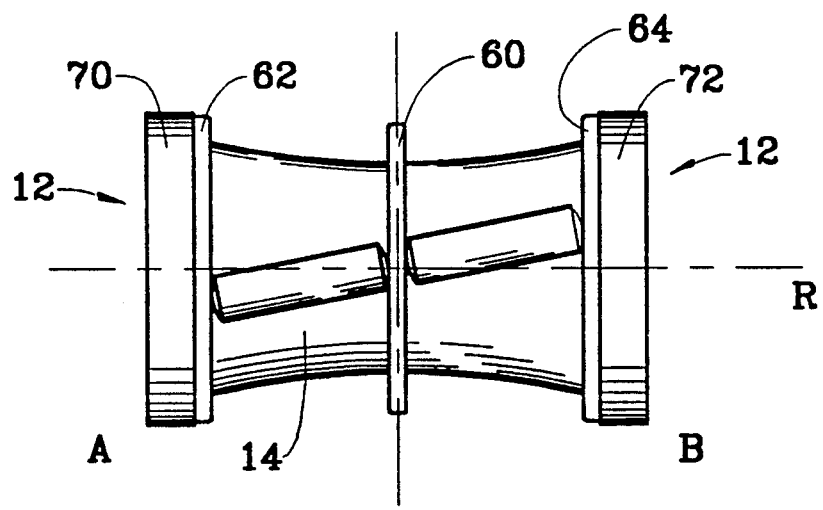
FIG. 6 is an alternative embodiment of a roller arrangement for use with the present invention.

FIG. 6 shows an alternative embodiment of a roller arrangement wherein rollers 30 are split into halves and divided by an annular ring 60. Also, in this embodiment, as is equally feasible with the other embodiments disclosed herein, thrust rings 62 and 64 are provided or slibdable engagement of said rollers with respect to annular shoulders 70 and 72 associated with first and second ends A and B, respectively, of inner race member 12. A plurality of rollers 55 is placed between annular ring 60 and annular shoulder 670. A plurality of rollers 57 are further placed between annular ring 60 and annular shoulder 72.

The instant invention has been shown and described herein in which is considered to be the most practical and preferred embodiment. It is recognized, however, that departures may be mace therefrom within the scope of the invention and that obvious modifications will occur to a person skilled in the art.

What I claim is:

1. A reversible unidirectional clutch coupling of the hyperboloidal type, comprising:
    a symmetrical, concave, inner race member defining a curved inner race surface;
    a plurality of cylindrical thrust transmitting rollers disposed over the length of the entire inner race surface, al said rollers being similarly inclined with respect to radial planes;
    an outer race member having an outer race surface defining a curving outer race surface with a single discontinuance therein disposed in surrounding relationship to said thrust transmitting rollers and said inner race surface such that at least one half of said outer race surface makes line contact with said rollers for thurst transmitting engagement through said rollers with said inner race member for attempted relative rotation of said inner and outer race members in one direction but which permits said outer race members in one direction but which permits said outer race member to rotate freely with respect to said inner race member in the opposite direction of rotation;
    said inner race member having a first large diameter end and a second large diameter end opposite said first large diameter end;
    said first and second large diameter ends of said inner race member having connected thereto first and second annular shoulder members, receptively, adapted to support first and second ends of said rollers axially;
    first bearing means positioned between said first ends of said inner race member in the opposite direction of said rollers nd said first annular shoulder member;
    second bearing means positioned between second ends of said rollers and said second annular shoulder member.

2. The coupling of claim 1, wherein said outer race member is reciprocally movable with respect to said inner race member in the direction of the axis of rotation of said coupling.

3. The coupling of claim 2, wherein said inner race member has a minimum diameter throat section passing through an axis of symmetry with respect to said coupling, wherein when said outer race is centered with respect to said axis of symmetry the outer race surface does not contact said rollers and hence the outer race member is permitted to rotate freely in both directions with respect to said inner race member.

4. The coupling of claim 2, wherein said outer race member may be moved longitudinally with respect to said inner member to thereby bring the other half of said outer race surface into contact with said thrust transmitting rollers to cause torque transmitting engagement between said inner and outer race members through said rollers with respect to attempted rotation of said outer race member relative to said inner race member yet allowing said outer race member to rotate freely with respect to said inner race member with respect to rotation in the opposite direction.

5. The coupling of claim 1, wherein said inner race surface defines a sub-derivative hyperboloidal surface and wherein said outer race surface defines a super-derivative hyperboloidal surface.

6. A reversible unidirectional clutch coupling of the hyperboloidal type, comprising:
    a symmetrical, concave, inner race member defining a curved inner race surface;
    a plurality of cylindrical thurst transmitting rollers disposed over the length of the entire inner race surface, all said rollers being similarly inclined with respect to radial planes;
    an outer race member having an outer race surface defining a curving outer race surface with a single discontinuance therein disposed in surrounding relationship to said thrust transmitting roller san said inner race surface such that at least one half of said outer race surface makes line contact with said rollers for thrust transmitting engagement through said rollers with said inner race member for attempted relative rotation of said inner and outer race membmers in one direction but which permits said outer race member or rotate freely with respect to said inner race member in the opposite direction of rotation;
    said inner race member having a first large diameter end and a second large diameter end opposite said first large diameter end;
    said first and second large diameter ends of said inner race member having connected thereto first and second annular shoulder members, respectively, adapted to support first and second ends of said rollers axially;
    first bearing means positioned between said first ends of said rollers nd said first annular shoulder member;
    second bearing means positioned between second ends of said roller and said second annular shoulder member;
    wherein said cylindrical rollers are interrupted by at least one annular thrust washer member surrounding the minimum diameter portion of said inner race member dividing said rollers into a first series and a second series, said outer race surface being engagable alternatively with said first set of rollers or said second set of rollers for unidirectional clutch operation in a first direction of rotation for a second direction of rotation, respectively.

* * * * *